(12) United States Patent
Vergnaud et al.

(10) Patent No.: US 8,864,071 B2
(45) Date of Patent: Oct. 21, 2014

(54) SEAT WHICH CAN BE CONVERTED INTO A BED

(75) Inventors: Franck Vergnaud, Saint Medard d'Aunis (FR); Didier Guinot, La Rochelle (FR); Gabriel Martin, Echillais (FR)

(73) Assignee: EADS Sogerma, Merignac (FR)

( * ) Notice: Subject to any disclaimer, the term of this patent is extended or adjusted under 35 U.S.C. 154(b) by 138 days.

(21) Appl. No.: 13/484,594

(22) Filed: May 31, 2012

(65) Prior Publication Data

US 2012/0305705 A1 Dec. 6, 2012

(30) Foreign Application Priority Data

Jun. 1, 2011 (FR) ...................................... 11 54841

(51) Int. Cl.
- *B64D 13/00* (2006.01)
- *B64D 11/06* (2006.01)
- *B60N 2/01* (2006.01)
- *B60N 2/34* (2006.01)

(52) U.S. Cl.
CPC ........ *B64D 11/06* (2013.01); *B64D 2011/0658* (2013.01); *B64D 2011/062* (2013.01); *B60N 2/01* (2013.01); *B60N 2/34* (2013.01)
USPC .............................. 244/118.6; 297/63; 297/65

(58) Field of Classification Search
USPC ..................... 297/63, 65; 244/118.6
See application file for complete search history.

(56) References Cited

U.S. PATENT DOCUMENTS

| | | | | |
|---|---|---|---|---|
| 7,523,888 B2 * | 4/2009 | Ferry et al. | ................. | 244/118.6 |
| 7,578,470 B2 * | 8/2009 | Plant | ......................... | 244/118.6 |
| D649,793 S * | 12/2011 | Porter et al. | ................... | D6/356 |
| D652,644 S * | 1/2012 | Porter et al. | ................... | D6/356 |
| D652,645 S * | 1/2012 | Porter et al. | ................... | D6/356 |
| 8,118,365 B2 * | 2/2012 | Henshaw | ...................... | 297/245 |
| 8,196,864 B2 * | 6/2012 | Ruiter et al. | ............... | 244/118.6 |
| 8,348,195 B2 * | 1/2013 | Ersan | ......................... | 244/118.6 |
| 8,382,036 B2 * | 2/2013 | Ruiter et al. | ............... | 244/118.6 |
| 8,414,076 B2 * | 4/2013 | Plant | ....................... | 297/354.13 |
| 2004/0232283 A1 * | 11/2004 | Ferry et al. | ................. | 244/118.6 |

(Continued)

FOREIGN PATENT DOCUMENTS

| | | |
|---|---|---|
| GB | 2405791 | 3/2005 |
| WO | 2009120308 | 10/2009 |

OTHER PUBLICATIONS

French search report dated Dec. 20, 2011 in corresponding FR 1154841.

*Primary Examiner* — Philip J Bonzell
(74) *Attorney, Agent, or Firm* — Young & Thompson

(57) ABSTRACT

In a block of two seats side by side which can be converted individually between a chair configuration and a horizontal flat bed configuration, the two seats are arranged and oriented substantially in the same direction, the longitudinal axes of each of the seats in the bed configuration converge towards a point situated behind the seats at a distance such that upper parts of the seat backs and of the head rests are superposed in a head area of the block. The bed planes of the seats of a block are vertically offset and extended by rest surfaces of the foot areas arranged in lateral columns arranged to the sides of the head area in the region of the rear shell of a block situated in front, allowing to reduce the seat pitch without affecting comfort and allowing an improved layout of a cabin for transporting passengers.

20 Claims, 3 Drawing Sheets

(56) References Cited

U.S. PATENT DOCUMENTS

| | | | |
|---|---|---|---|
| 2007/0069073 A1* | 3/2007 | Ferry et al. | 244/118.6 |
| 2007/0080566 A1* | 4/2007 | Ferry et al. | 297/248 |
| 2007/0241235 A1* | 10/2007 | Atchison | 244/122 R |
| 2007/0246981 A1* | 10/2007 | Plant | 297/248 |
| 2009/0066121 A1 | 3/2009 | Jacob | |
| 2009/0084897 A1* | 4/2009 | Ferry et al. | 244/118.6 |
| 2009/0243352 A1* | 10/2009 | Cailleteau | 297/188.01 |
| 2009/0243358 A1* | 10/2009 | Henshaw | 297/340 |
| 2010/0038484 A1* | 2/2010 | Ersan | 244/118.6 |
| 2010/0065684 A1* | 3/2010 | Ruiter et al. | 244/118.6 |
| 2010/0116936 A1* | 5/2010 | Plant | 244/118.6 |
| 2010/0252680 A1* | 10/2010 | Porter | 244/118.6 |
| 2011/0156450 A1* | 6/2011 | Collins et al. | 297/135 |
| 2011/0309662 A1* | 12/2011 | Veneruso | 297/232 |
| 2012/0217344 A1* | 8/2012 | Ruiter et al. | 244/118.6 |
| 2012/0292957 A1* | 11/2012 | Vergnaud et al. | 297/188.08 |

* cited by examiner

SEAT WHICH CAN BE CONVERTED INTO A BED

The present invention belongs to the field of fitting out cabins of means of passenger transport.

More particularly, the invention relates to a seat which can be converted into a bed which is particularly suited to the requirements of passenger cabins, for example aircraft cabins.

Within the field of transporting people, it is known to offer a seat which can be converted during the journey to passengers who have to make a relatively long journey so that the passenger can choose between a seated position and a relaxed position, where the relaxed position can correspond to a lying flat position.

A chair which can be converted into a bed proves to be a particularly advantageous solution when the length of the journey makes it relatively uncomfortable to remain in a seated position throughout the journey and when the journey is nevertheless sufficiently short not to justify individual cabins.

This type of solution is found, for example, in the cases of long-haul aeroplanes where a journey includes just one period of sleep and where there is often a very limited amount of space available.

This is also the case for some journeys by train, coach or boat, depending on the length of the journey.

It is known to produce chairs for which a combined movement of the seat cushion, the seat back and a leg rest positioning these different parts of the chair substantially horizontal in a same plane makes it possible to form a bed which may be extended by a bench fixed at the same height as the bed plane.

Such chairs which can be converted into a flat bed offer the desired comfort but, when a large number of them are installed in a passenger cabin, they entail a longitudinal distance between the seats (the cabin seat pitch) which is at least equal to the length of the bed obtained, and usually a greater distance when an occupant of a seat adjacent to another seat needs to access an aisle which is not next to them.

This type of comfort, which requires a lot of space, is hence reserved for luxury cabins and means that the number of seats which can be installed in a given cabin length is limited.

In order to increase the number of seats in a cabin whilst reducing the distance between seats, it is also known to limit the movements of the parts of the seat so as to bring the seat into a mean horizontal or highly inclined position but with the angles between the different parts (seat cushion and seat back, on the one hand, and seat cushion and leg rest, on the other hand) being maintained so as to obtain a profile in the shape of a flattened Z.

The saving in the length of the seat in this so-called "relaxed position" allows a cabin layout with a reduced seat pitch compared with the flat bed solution but it is less comfortable and is generally unsatisfactory for passengers in business or first class.

Another known solution for reducing the seat pitch in the case of a flat bed or a relaxed position consists in arranging a space beneath the seat in front of another seat, into which the occupant of the seat behind puts their feet.

However, this solution proves to be detrimental to comfort as it does not allow passengers to lift up their feet enough and, in the case of a flat bed, means that the bed is not horizontal but substantially inclined to the horizontal.

The fierce competition in the field of transport thus creates a difficult compromise between a cabin with seats having an integral and horizontal flat bed, which is commercially very attractive, and a cabin having more seats without such a flat bed, which is thus more profitable economically but less attractive commercially.

The present invention relates to the fitting out of a cabin for transporting passengers, in which the seats can be converted into flat beds and in which the seat pitch is substantially less than the length of the bed, for example equivalent to that which would be needed for seats having a relaxed position.

Such a result is obtained by implementing the seats of the invention which are arranged in blocks of two seats.

In a block of seats of the invention, each seat can be converted individually by a relative movement of elements of the seat between a chair configuration in which an occupant of the seat is in a seated position and a bed configuration in which the elements of the seat are placed so as to form a bed plane and in which an occupant of the seat is stretched out substantially flat and substantially horizontally.

The two seats of a block are arranged side by side and oriented substantially in the same direction, and:

the longitudinal axis of each of the seats, when the seats are in the bed configuration, converges towards a convergence point situated in a vertical plane of symmetry of the block behind the seats such that the longitudinal axes of the two seats of the block are closer together in the head area in which the upper parts of the seat backs and the head rests of the two seats are at least partially superposed in a vertical projection;

when the two seats are in the bed configuration, the bed planes of the two seats are at different heights relative to the floor of a cabin in which the block would be installed.

Thus is obtained a partial superposition of the seats in the bed configuration which can be achieved without hindrance to the occupants of the beds because of the vertical offset, this superposition making it possible to obtain, in the region of partial superposition, a reduction in the width required for the beds.

Because of the reduction in width in the head area, the block of two seats comprises in its rear part on each side of the head area a lateral column in which there is arranged a foot area which would be located substantially along the longitudinal axis of a seat, situated on the same side as the foot area in question, but of a block positioned behind the block in question, a separating space away, the pitch X of the blocks in a layout, which is less than a desired length L0 of the bed of the similar block behind. Thus the space corresponding to these lateral columns, made possible by the convergence of the seats in the bed configuration at the head end, makes it possible to create a space for extending the bed of the block situated behind by the desired length.

Considering the height of the seat cushion of the seats in the chair configuration as the reference height above the floor, the vertical offset of the two bed planes of the seats of a block is obtained by one of the bed planes in the bed configuration above the seat cushion in the chair configuration, or by at least one of the bed planes below the seat cushion in the chair configuration for at least one of the two seats.

To distribute the vertical offset between the bed planes and limit the amplitudes of the vertical movements of the seats, the bed plane of one of the two seats is preferably above a vertical position of the seat cushions of the seats in the chair configuration and the bed plane of the other seat is below the position of the seat cushions.

So that each bed of a block situated behind a block in question, in the same direction and substantially with the same axis, has an independent bed surface, the column has two foot areas which are separate from each other and open in the direction facing the rear of the block.

Each foot area comprises a rest surface substantially in a horizontal plane. The foot areas are open at the rear, towards the block situated behind the block in question. The foot areas are situated, heightwise, such that the rest surfaces intended to support the feet in the lying-down position are each level with the bed plane of which they form part when the seats of a block situated behind the block in question are in the bed configuration.

In a preferred embodiment, the bed plane of a seat in the bed configuration is determined by the seat cushion of the said seat, the seat back and the head rest of the said seat, a leg rest of the said seat and/or one or more movable panels, the plane being extended by a rest surface of a foot area of a similar block which would be placed in front of the block in question or, for the first block of a line of blocks, of a modified rear shell having characteristics similar to the lateral columns of a block, the seat cushion, the seat back, the head rest, the leg rest, the movable panel or panels and the rest area in terms of those items that are actually used to form the bed, being aligned substantially horizontally and in a same plane to form the bed.

In order to ensure that the head area, in particular that of the lowest bed, has a sufficient space in order to satisfy the comfort of the passengers, the bed planes of the two seats are vertically offset by a sufficient comfort distance of, for example, between 350 mm and 500 mm when the seats are both in the bed configuration.

This sufficient height in general makes it possible to limit the amplitude of the up and down movements of the seats and simplify the mechanical parts responsible for permitting the movements in question.

The lateral columns of a block, the dimensions of which are imposed at least by those of the foot areas which need to be available, forms a large volume which is not entirely used by the foot areas and which advantageously makes it possible to integrate relatively easily technical equipment for the block and/or comfort or entertainment equipment which can be used by the occupants of the seats of a block situated behind the block in question.

The invention also relates to a cabin or a part of a cabin for transporting passengers having at least one line of at least two blocks of two seats of the invention arranged one behind the other in the same direction of orientation of the seats and separated, in a direction of the line of blocks, by a pitch X characterizing the distance between a reference point of each of the blocks.

In the aeroplane cabin of the invention, for each of the two seats of a block, following another block which precedes it in the direction of orientation of the seats, in the bed configuration a bed plane of each seat is extended by a foot area situated in front of the seat, inside the block preceding it, in the lateral column situated on the same side of the block as the seat in question.

Furthermore, the bed planes of the seats of a block in the bed configuration being at different heights above the floor of the cabin in order to prevent interference between the spaces occupied by the two beds of a block in the head area of the block, in order to make it easier for a passenger occupying the highest bed to move between their seat and the aisle of the cabin, the seat of a block with a bed plane situated vertically closest to the floor of the cabin is situated on the side of the block bordered by an aisle.

The cabin thus offers passengers beds with a length greater than the seat pitch, which makes it possible to increase the number of seats for a given cabin length or to reduce the length of the cabin for a number of seats installed.

In order to adapt to the limitations of the layout of a given cabin or to provide beds with different dimensions, the pitch X of the blocks of at least one line of blocks is modified to form beds of different lengths L0 in the bed configuration, depending on the block in question.

The frontmost block in a line of blocks is advantageously preceded, at the front in a direction of orientation of the seats of the said line, by a modified rear shell comprising lateral columns similar to the lateral columns of a block so as to have the same sleeping comfort on the seats of a first block at the front of a line of blocks by employing a block according to the other blocks employed in the line of blocks and generally in the cabin.

A vehicle for transporting passengers, in particular a land transport vehicle or a sea transport vehicle or alternatively an air transport vehicle, featuring such a cabin makes it possible to provide, with an improved passenger density, the degree of comfort of an actual flat bed, in particular when the journey length does not justify, in terms of the service offered, separate passenger cabins.

A description of an embodiment of the invention is made with reference to the drawings in which, schematically: FIG. 1 shows a view from above of a set of three aligned blocks of two seats according to the invention in a passenger cabin;

Figure 1:
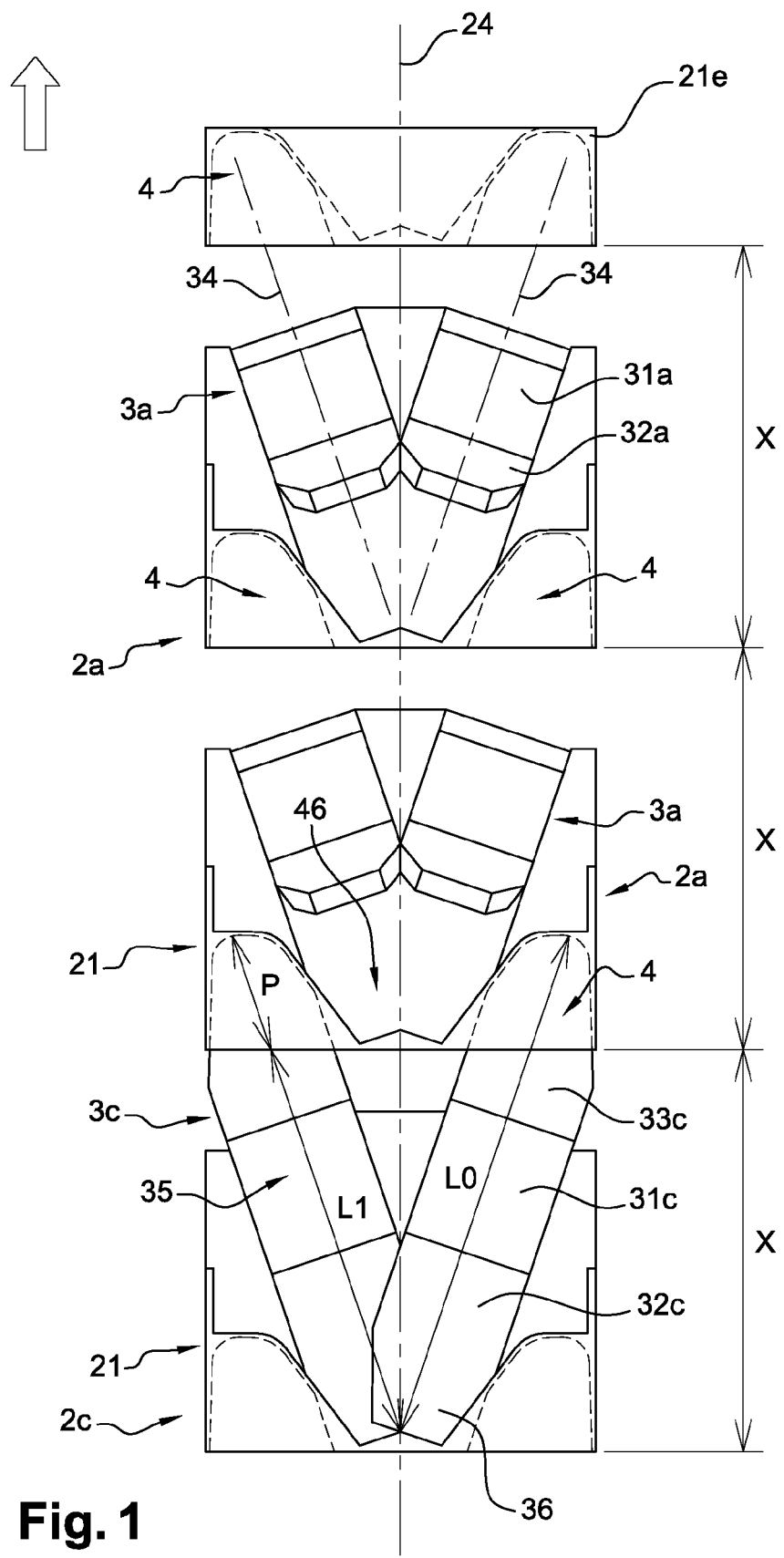

The present invention relates to a seat 3 which can be converted between a chair configuration in which an occupant of the seat is in a seated position and a flat bed position in which an occupant of the seat is stretched out substantially flat and substantially horizontally.

More particularly, the invention relates to a side-by-side arrangement of two seats which can be converted individually into flat beds, referred to as block 2, and relates to a means of passenger transport, for example an aeroplane, in which a cabin 1 or part of a cabin employs at least two blocks arranged in a line, one behind the other.

In the present description and the associated drawings, a reference number designating a same or similar element will, where appropriate, be followed by the suffix "a" when it refers to the element in a "chair" configuration of the seat, and by the suffix "c" when it refers to the element in a "bed" configuration of the seat, these two configurations, together with a relaxed configuration which corresponds to an intermediate position that has not been depicted, being detailed in the following description.

For example, a seat generally has the reference number 3, the reference number 3a designating a seat in the chair configuration and the reference number 3c designating a seat in the bed configuration.

FIG. 1 shows in a view from above three blocks 2 aligned one behind the other in a row of blocks which may comprise any number of blocks in a similar arrangement, depending on the dimensions of the cabin.

Although not obligatory, the seats are usually oriented with the passenger in a seat facing the front of the cabin in the direction of travel, symbolized by the arrow in the drawing, and this direction convention will be used in the following detailed description.

In the present description, unless stated otherwise, generally the terms "front", "rear", "high", "low", "above", "below", "forwards", "backwards", "up", "down", "sideways" etc. have the meaning that would be understood by an occupant of the seat relative to their position when seated in the chair configuration.

In FIG. 1, the seats 3a of the frontmost two blocks 2a are illustrated in the chair configuration and the seats 3c of the rear block 2c are illustrated in the flat bed configuration.

In a known manner, a seat 3 comprises mainly a seat cushion 31, a seat back 32, of which an upper part in the chair configuration corresponds to a head rest 36, and possibly, and for preference, a leg rest 33.

In a likewise known manner, in the chair configuration of the seat 3a, the seat back 32a is straightened into a position close to the vertical and the leg rest 33, which cannot be seen in the view from above of the seats 3a of the front block 2a, is folded down so as to reproduce the classical configuration of a seat or chair.

In the flat bed configuration of the seat 3c, the seat cushion 31c, the seat back 32c and the leg rest 33c are in a substantially horizontal position and aligned so as to form a bed plane 35.

In a relaxed configuration of the seat (not illustrated), the seat cushion 31 and the seat back 32 form an angle facing upwards, the seat back being inclined backwards, and where appropriate the seat cushion 31 and the leg rest 33 form an angle facing downwards, so that the seat 3 has a profile in the shape of a more or less open flattened Z.

Each seat has a longitudinal axis 34 corresponding in the view from above to the extension of a vertical plane of symmetry of the seat 3, and a block 2 has a longitudinal axis 24 corresponding in the view from above to the extension of an overall vertical plane of symmetry of the block, the two seats 3 of a block being themselves arranged side by side in the block with a similar longitudinal position in the block 2 and substantially oriented in a same direction.

However, as can be clearly seen in FIG. 1, the seats 3 have the feature of not being oriented in exactly the same direction and the longitudinal axes 34 of each of the two seats of a block 2 converge towards the axis of the said block behind the seats.

In the preferred illustrated embodiment, the arrangement of the seats of a block is symmetrical and the axes of the two seats of the block converge in practice, as seen from above, towards a same point of convergence situated behind the seats, substantially in the vertical plane of symmetry of the block.

This convergent configuration is associated with lateral columns 4 situated on each side of a given block 2 level with the seat backs 3 of the block in question when the seats are in the bed configuration.

When the seats 3c of a block are in the bed configuration, the seat backs 32c of the two seats of the block 2 are inclined backwards into a substantially horizontal position and upper parts of the seat backs and the head rests 36 then find themselves in a head area 46 of a rear shell 21 of the block situated between the lateral columns 4 of the same block.

These lateral columns 4 are integrated into the structure of the block 2 in the region of the rear shell 21, providing a cover for the rear part of the seats of the block.

The lateral columns 4 are situated longitudinally substantially at the point of convergence of the longitudinal axes 34 of the seats 3 in a position where a lateral distance between the said longitudinal axes is reduced due to their convergence.

More particularly, the convergence of the longitudinal axes 34 of the seats 3 is such that, when a seat 3 of a block situated just behind the block 2 in question is placed in the flat bed configuration, the lateral columns 4 are situated, when viewed from above, substantially in the extension of the bed formed, and in the region of the feet of an occupant of the seat in the bed configuration.

Thus, as illustrated in FIG. 1, the lateral columns 4 integrated into the rear shell 21 are in the extension of the bed formed by each of the seats 3c of the block 2c situated behind.

Another feature of the seats of the invention is that the length L1, termed the base length, of the bed surface formed by the seat back 32c with the head rest 36, the seat cushion 31c and the leg rest 33c of a seat, in the longitudinal direction of the bed corresponding substantially to the direction of the longitudinal axis 34 of the seat, is less than a desired length L0 for the flat bed, and that a dimension of the lateral columns 4 in the directions of the axes 34 of the seats 3 of the block 2 situated behind the said column, termed the depth P of the lateral column, corresponds substantially to the additional length which must be added to the base length L1 to obtain the desired length L0 for the bed.

The lateral columns 4 of a block thus determine, in front of each seat 3 of the block situated immediately behind, a space associated with each seat in front of the seat in question in the bed configuration, termed the foot area 41, into which, subject to the arrangements detailed below, the feet of an occupant of the seat in the flat bed configuration can be introduced if required by the size of the person.

It will thus be understood that the lateral columns 4 are, at least in the extension of the flat bed, on the one hand hollow and on the other hand open towards the seats 3 of the block 2 situated behind.

Figure 2A:
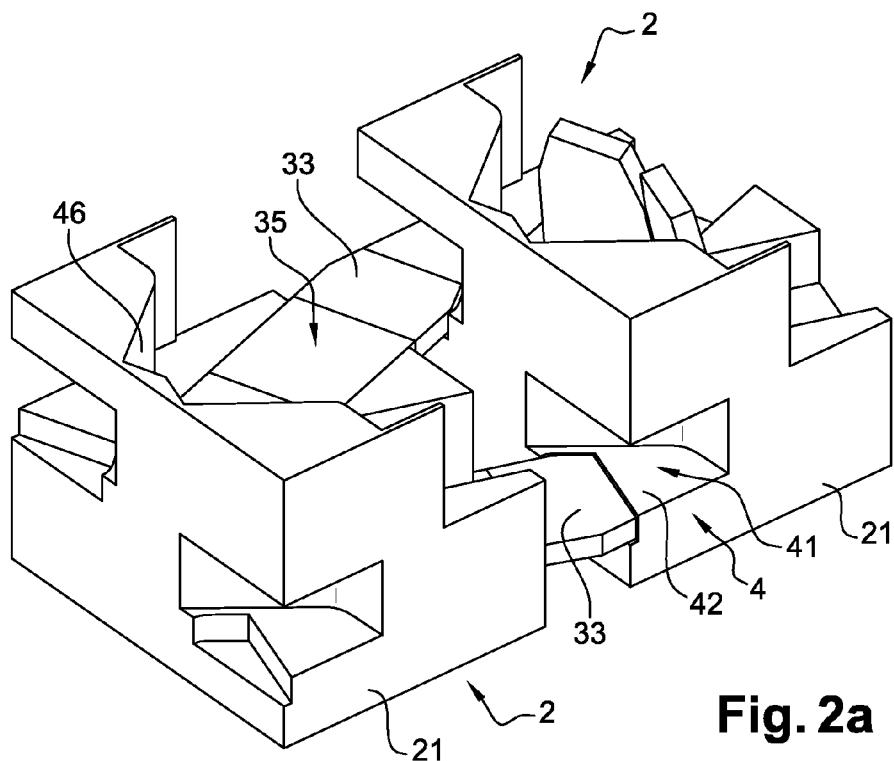
FIGS. 2a and 2b show perspective views, from behind in FIG. 2a and from the front in FIG. 2b, of a set of two blocks similar to the blocks shown in FIG. 1.
Figure 2B:
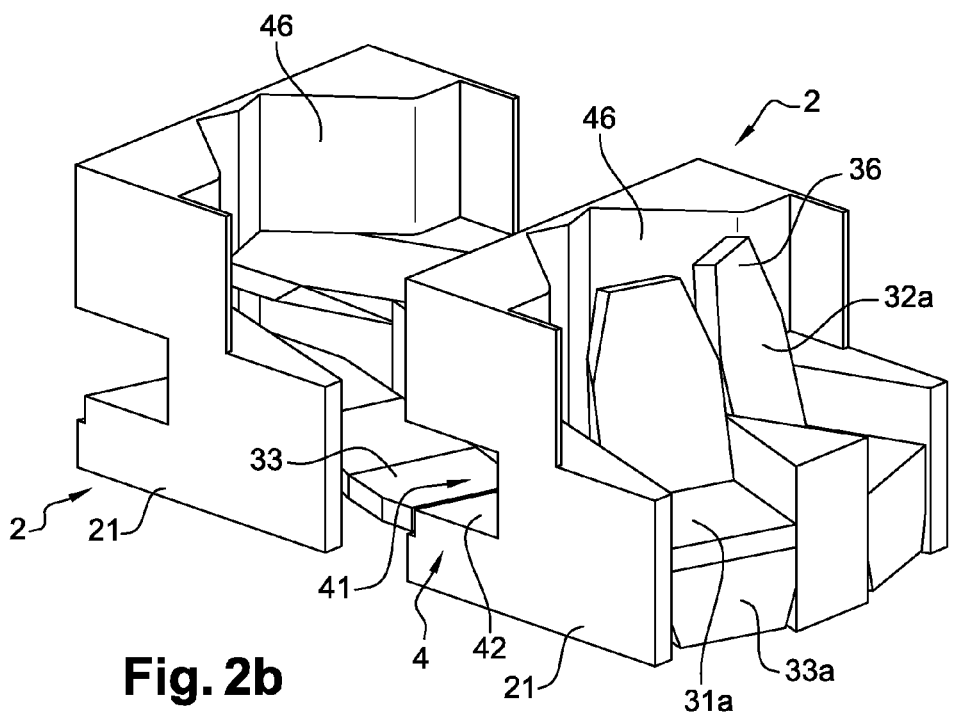

Furthermore, so that a passenger can rest their feet, if need be, if the leg rest 33 is not long enough to give the bed the desired length, a substantially horizontal rest surface 42, possibly with a suitable padding for this purpose, is positioned in the extension and at the same height as the other flat bed surfaces, as illustrated in FIGS. 2a and 2b.

It will also be understood that the depth P in question here is an internal dimension of the hollow parts of the lateral columns 4, the walls of which necessarily have a certain thickness, even if this thickness may be relatively small, given the limited loads to which the structure of the rear shell 21 of the seat is subjected, and that the height of the rest surface 42 is fixed a priori.

Given their geometrical arrangement and the fact that the axes 34 of the seats converge, when viewed from above, as illustrated in FIG. 1, the head rests 36 of the two seats of a block are superposed at least partially in the region of an interference zone when the two seats are in the bed configuration.

In order to overcome the apparent conflict between the volumes needed by the two beds of one block in the region of the head area 46 of a rear shell 21, another feature of the invention relates to the relative vertical positions of the flat bed planes 35 of the two seats 3 of a same block 2.

With reference to FIG. 2a which illustrates two blocks in FIG. 1 in a perspective view partially from behind, it will be noted that the two flat bed planes 35 of one block 2 are vertically offset so that each seat of the block has its own volume in the head area 46, the separation between the two volumes being achieved by the vertical offset, and furthermore each flat bed also has its own foot area 41 which is located in the lateral column 4 on the corresponding side of the block situated in front of the block in question.

This vertical offset means that all of the possible length of the rear shell 21 can be put to use both for the head area 46 and for the foot areas 41 which areas are juxtaposed and superposed over a width of the rear shell 21.

The bed plane 35 of each seat 3 and the corresponding rest surface 42 of the foot area 41 are positioned at the same height in the continuation of one another when the foot areas have rest surfaces for the feet (this case is illustrated), or alternatively are of sufficient dimensions that the leg rest 33 of the seat deploys into the flat bed configuration inside the corresponding lateral column 4 when the leg rest is supporting the feet in the flat bed configuration (this case is not illustrated).

When the seats 3 of the invention are employed so as to be converted from the chair configuration, in which the seat cushions 31 of the seats 3 are a priori situated substantially at the same height with respect to a floor of the cabin, into a flat bed configuration, one of the seats 3 of the block 2 is subjected to an overall downward movement, whereas the adjacent seat of the said block is subjected to an overall upward movement.

These downward and upward movements are relative movements between the two seats, the important result being to obtain a desired vertical offset with respect to the floor between the final reclined positions and enough vertical separation to keep the users comfortable.

In practice, to prevent large-amplitude vertical movements for one of the seats and also to prevent one of the beds being too high or too low, it is advantageous to share the vertical displacement to be performed between the two seats of the block.

The movements of a seat 3 of a block 2 are preferably independent of the movements of the other seat of the block.

In an embodiment, considering a standard value of the height of the seat cushion of a chair above the floor of the cabin of approximately 430 mm, the bed plane 35 of the seat which assumes the lowest position is lowered by 180 mm so as to maintain the bed plane of this seat at approximately 250 mm above the floor of the cabin, and the bed plane of the seat which assumes the highest position is raised by 250 mm, i.e. is 430 mm above the lowest bed plane, so as to create in the head region 46 a vertical separation of about 400 mm in height given the thicknesses of the panels and trims needed, a separation of between 350 mm and 500 mm usually proving satisfactory, depending on the desired level of comfort.

The necessary movements of the different parts of the seats are performed by any device having kinematics suitable for the desired movements and combinations of movements.

The desired vertical movement is, for example, obtained either by the same device used for the movements of the parts of the seat 3 (seat back 32, seat cushion 31 and leg rest 33) in order to effect the conversion between the chair configuration and the bed configuration, or is obtained by a separate device from the device which moves the parts of the seat 3 relative to one another, for example a mechanism dedicated to the vertical movement such as a telescopic column or a scissor linkage supporting the seat cushion and associated with an actuator (not shown in the drawings).

The different movements are advantageously performed by one or more electric actuators integrated into the seat 3 and which are capable of being controlled by the occupant of the seat.

In practice, the vertical movement of a seat 3 must be performed in order to prevent the mechanical interference that could occur between the two adjoining seats of a block 2 during the change into the flat bed configuration in the region of the head rest 36.

Where necessary, each seat 3 is provided with movement limiters in the form of mechanical stops or with an actuator control logic so as to prevent combinations of movements of moving parts of the seats which could cause mechanical interference.

The description of a preferred exemplary embodiment may have alternatives within the knowledge of a person skilled in the art without going beyond the scope of the present invention.

For example, a seat may have a plurality of intermediate positions and its position may even be continuously adjustable between the extreme positions or between the chair configuration and an intermediate position.

In an embodiment, the seat 3 does not comprise a leg rest 33 or has a leg rest with reduced dimensions. The said seat mainly comprises a seat cushion 31 and a seat back 32, as detailed above, and possibly the leg rest with reduced dimensions, which form a flat bed part. In this embodiment, if a space remains open between a front edge of the seat cushion 31 or the leg rest in the bed configuration and the foot area 41, the said open space is closed by a movable panel which is not shown but is functionally equivalent to the leg rest 33 in the bed configuration position.

Such a movable panel is stored, when the seat is in the chair configuration, for example beneath the seat cushion 31 of the seat or in the lateral column 4 or in the foot area 41, or alternatively in a bench or partition. The said movable panel is, for example, a sliding one or is articulated or alternatively detachable and it may result from the assembly of panels which, when arranged in the deployed position, complete the flat bed surface 35.

In an embodiment the orientation of the axis 34 of a seat is modified depending on the configuration in which the seat is placed.

For example, the axis 34 of the seat is oriented parallel to the axis 24 of the block when the seat is in the chair configuration or in the relaxed configuration, and the axis 24 of the seat is oriented so as to converge towards a point of the axis of the block as described above when the seat is in the bed configuration in order to take advantage of the head area 46 of the block and of the volumes of the lateral columns 4 of the block situated in front. The orientation of the axis 34 of the seat is changed, for example, by rotation of the seat cushion 31 during the conversion into or from the bed configuration.

As already specified, the orientations of the blocks 2 may differ from the direction of travel of the vehicle, in particular the blocks or some of the blocks may be oriented with the front face of the blocks facing the rear of the vehicle, or may be more or less further away from the axis of the vehicle in order to meet specific installation constraints.

The limitations of these orientations are above all dictated by comfort reasons and possibly by safety or legal reasons, the benefit of the invention being obtained by the arrangement in a line of at least two blocks of seats as illustrated in the different figures.

In a preferred embodiment corresponding to the case illustrated in FIGS. 2a and 2b, the rear shell 21, which is for example made from composite materials because of the possibilities afforded by these materials in terms of shapes that can be formed with advantageous rigidity and mass, takes the form of a single part or an assembly of parts and encloses the mechanisms that perform the movements of the elements of the seats for aesthetic reasons and for the safety of the occupants of the seats.

The lateral columns 4 in which the foot areas 41 are arranged, for the parts which are not occupied by the said foot areas, are advantageously used to form volumes for stowing personal effects of the occupants of the seats or for the installation of essential or auxiliary devices of the seat such as power supplies for the seat actuators and their safety devices, or such as comfort-providing equipment, individual lighting and air conditioning for example, or entertainment equipment for the occupants of the seats, in particular video screens, or alternatively storage spaces.

Other auxiliary elements are advantageously associated with the rear shell 21 of a block.

For example, a separating partition (not depicted) for the two seats 3 of a block 2 can be arranged in the block in question.

In a preferred embodiment, this partition has at least one at least partially retracted position which allows the occupants of the two seats side by side to hold a conversation in good conditions, and at least one extended position in which each occupant of a seat has a degree of privacy.

Furthermore, although the drawings illustrate blocks 2 which, at the scale to which the drawings have been drawn, look symmetrical, the symmetry of the blocks or the seats with respect to their respective planes of vertical symmetry may be imperfect without going beyond the scope of the present invention.

For example, the seats 3 of a same block 2 may have slightly different longitudinal positions or angles of convergence with the axis of the block, for example for reasons of optimizing installation or assembly, without the benefits of the invention being jeopardized.

The invention also relates to an arrangement of a cabin of a transport vehicle for transporting passengers, for example a cabin of a land vehicle such as a coach or a train, a sea transport vehicle such as a surface ship or an aircraft such as an aeroplane, in which arrangement of the seats 3 for the passengers at least one line of at least two blocks of three seats 3 in accordance with the above-described blocks are arranged in lines of blocks 2.

Figure 3:
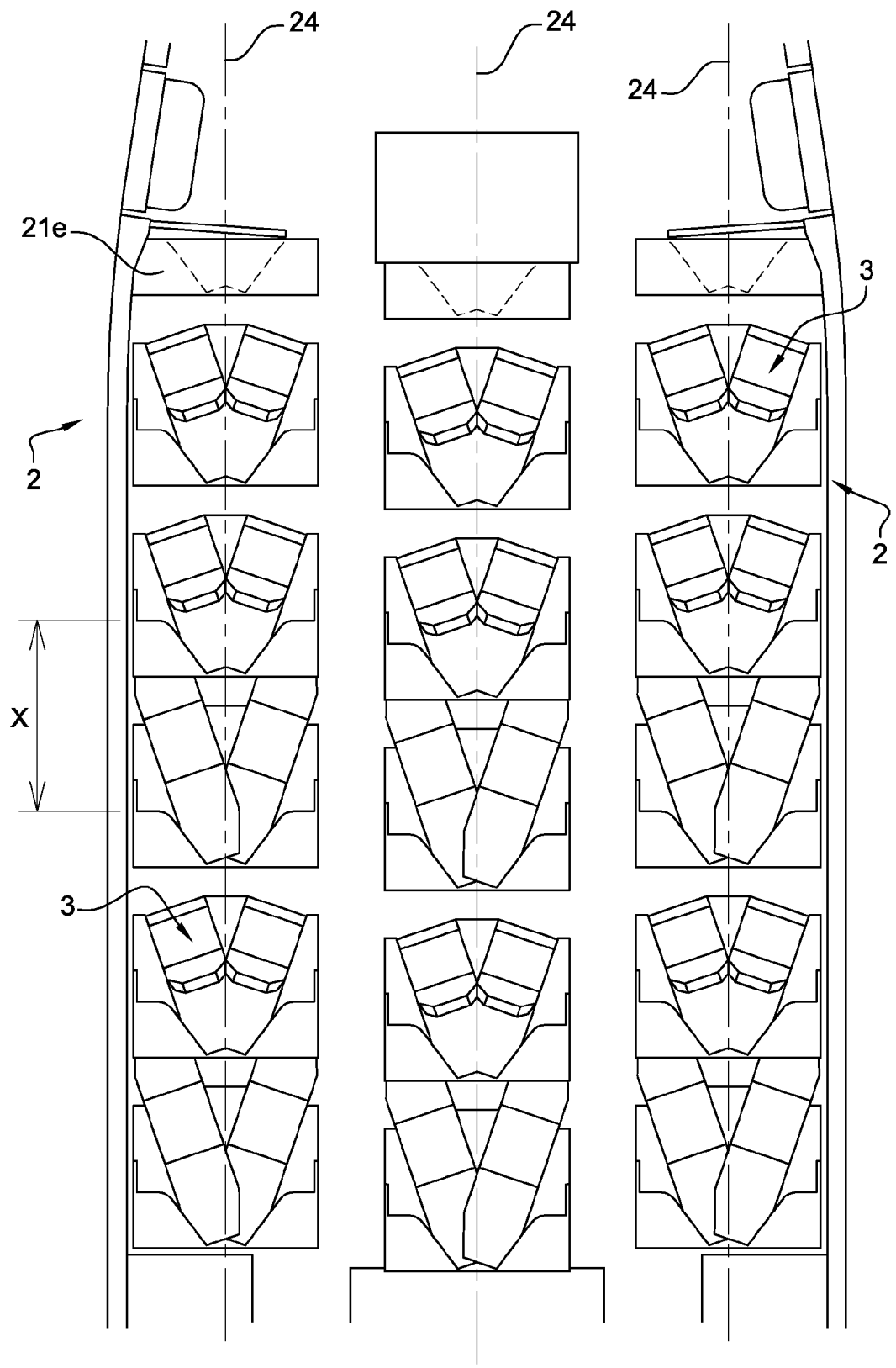
FIG. 3 shows an example of a layout of an aeroplane cabin according to the invention.

FIG. 3 illustrates such an example of an arrangement of an aeroplane cabin having three lines of five blocks 2, all oriented such that the passengers are in the chair configuration, sitting facing the front of the aeroplane, these values of both the number of lines and the number of blocks per line and this orientation being random for the purpose of illustration and implying no limitation on the invention.

For industrial and economic reasons, the different blocks are preferably identical or differ only in secondary characteristics, for example because of a specific position or environment in the cabin.

In such an arrangement, the pitch X of the seats 3, in other words also the pitch of the blocks 2 of two seats, corresponding to the distance between two successive blocks separating a reference point of the seats, is shorter than the length L0 because of the longitudinal overlap between the foot areas 41 and the head area 46, and by the angle formed by the axis 34 of the seats relative to the axis 24 of the line of blocks having a multiplying effect on the pitch by the cosine of the said angle.

The blocks are preferably formed and arranged in the cabin in such a way that the seat 3 of a block which has the lowest bed plane 35 relative to the floor of the cabin in the bed configuration is situated next to an aisle.

Thus, when the occupant of the highest bed needs to step over the lowest bed to access an aisle, this movement is made much easier.

This situation occurs in the case of the lines of blocks located to the sides of the cabin, along the walls of the fuselage in the case of FIG. 3, the passenger occupying the bed next to the wall being able to access the aisle only by stepping over the bed next to the aisle.

This situation also occurs in a layout configuration (not shown) which has two lines of blocks without an aisle between the said two lines, for example in a configuration of a fuselage with a width that allows four lines of blocks to be installed, two lines of which are placed close to each other so that they almost touch and are bordered by an aisle on each side of the said two lines placed close together.

In order to allow the seats 3 of the first block 2 at the front of a line of blocks to benefit from the bed configuration with the desired bed length, a modified rear shell 21e having lateral columns 4 similar to those of the rear shell 21 of a block 2 but not integrated into a block, is arranged in the cabin 1 at the location that this rear shell would have if another block was located in front of the block in question.

This modified rear shell 4e may be isolated, as in the example illustrated in FIG. 3, or advantageously be integrated into other fittings, for example separating partitions of the cabin, cloakrooms or storage units.

The rearmost block of a line of blocks is also in a particular situation, as there is no other block behind it.

The lateral columns 4 of this block are advantageously used to create storage spaces which may or may not be integrated into fittings in a rear part of the cabin 1.

In an embodiment, the longitudinal axes 34 of the seats of one block make an angle of 37 degrees, the foot recesses 41 in the lateral columns 4 have depths P of approximately 500 mm and the seat pitch X is 1524 mm (60 inches), which makes it possible to form flat beds of at least 1800 mm with a seat pitch generally associated with seats limited to the relaxed configuration. These values can be modified to suit particular needs.

A layout comprising five blocks per line, such as the layout shown in FIG. 3, thus requires a cabin length 1380 mm less than that which would be necessary to install an equivalent number of flat beds of the same length, using the known seats in the current layouts.

It will be noted that this saving in bed length along with a reduced seat pitch is achieved at the cost of wider blocks of seats owing to the lateral juxtaposition of the lateral columns 4 and of the head area 46.

This widening is, however, compensated by a combination of the shapes chosen for the different elements forming a block.

On the one hand, when viewed from above the foot areas have an overall triangular section, with the apex pointing forwards, which shape is made possible by the convergence of the axes 34 of the seats of each block 2.

On the other hand, the seat backs 32 of the seats 3 have a reduced width in the region of an upper part of the seat back in the chair configuration and of the head rest which does not require as great a width as a back area.

Thus, when the seat back is inclined backwards so as to place the seat in the relaxed configuration or in the bed configuration, the upper part of the seat back 32 is capable of assuming a position further back than in the chair configuration without interfering with the lateral column 4 situated on the same side.

Thus, as illustrated in FIG. 1, at the intermediate block shown in the bed configuration, the shape of the seat back 32c and of the head rest 36 is adapted to the presence of the lateral column 4 and makes it possible to reduce the maximum width of the rear shell 21 by bringing the lateral columns 4 of the rear shell closer together.

In an embodiment, without making any still possible concession on the width of the seat cushion of the seats, in other words preserving a comfortable width of 533 mm (21 inches) for the seat cushion 31, the width of the blocks 2 of two seats is increased from 1372 mm (54 inches), in a conventional configuration with two seats side by side with no separation and parallel axes, to a width of 1448 mm (57 inches).

Analyses of the layouts in various aeroplane cabins show that there is usually no particular problem in increasing the width of the blocks, by 76 mm in the exemplary embodiment, when the cross section of the fuselage means that the width of the aisle or aisles between the lines of blocks needs to be reduced as a consequence.

In a particular embodiment of the invention, the blocks 2 are produced so as to conform to different bed lengths.

By adapting the dimensions of the leg rest and/or of movable panels between the seat cushion 31 and the foot area 41, and by adapting the pitch X of the blocks, the length of the beds in a block can be easily increased or reduced.

This advantage allows in particular a cabin with a greater degree of comfort to be provided or the configuration of a cabin to be optimized by offering, without undermining the design of the blocks themselves, some seats with beds that are longer than average and/or beds which are shorter than average by modifying the pitch X with which the blocks 2 are installed.

This solution proves to be particularly advantageous when the length of a cabin, which may be determined by other factors (exits, fixtures of the aeroplane, etc.), does not correspond exactly to a whole number of blocks arranged at a standard pitch and when some seats may be "lengthened" in order to meet exceptional needs for some larger-than-average passengers.

The invention thus makes it possible to produce very comfortable seats in the bed configuration with a pitch between the seats that is substantially less than the bed length, and to fit out cabins for passengers, in particular aeroplane cabins, with a greater number of seats than when they are fitted out with the known seats for a given bed length and a given cabin, or to reduce the length of a cabin for a given number of seats and a given bed length.

The invention claimed is:

1. A block (2) of two seats (3), in which each seat (3) can be converted individually, by a relative movement of elements (31, 32, 33, 36) of the seat, between a chair configuration in which an occupant of the seat is in a seated position and a bed configuration in which elements of the seat form a bed plane (35) and in which an occupant of the seat is stretched out substantially flat and substantially horizontally, wherein the two seats (3) are arranged side by side and oriented substantially in the same direction,
   wherein in the bed configuration, a longitudinal axis (34) of each of the seats (3) converges towards a convergence point situated in a vertical plane of symmetry of the block behind said seats such that the longitudinal axes (34) of the two seats of the block are closer together in a head area (46) of said block, in which head area upper parts of the seat backs and/or of the head rests (36) of the two seats (3) are at least partially superposed in a vertical projection;
   when the two seats (3) are in the bed configuration, the bed plane (35) of one of the two seats is situated at a different height, relative to a reference surface corresponding to a cabin floor when said block is installed in a cabin, from the bed plane of the other seat.

2. The block of two seats according to claim 1, comprising, in a rear part substantially on each side of the head area (46) a lateral column (4) comprising a foot area (41), said foot area being substantially along the longitudinal axis (34) of a seat (3), situated on the same side as the lateral column in question, of a similar block which would be placed behind the block (2) in question, in the same direction and substantially with the same axis, at a separating distance between the two blocks, termed the block pitch X, which is less than a desired length L0 of the bed of said similar block behind.

3. The block of two seats according to claim 2, in which the lateral columns (4) integrate technical equipment for the block and/or comfort or entertainment equipment which can be used by the occupants of the seats of a block situated behind the block (2) in question.

4. The block of two seats according to claim 2, in which the foot areas (41) each comprise a rest surface (42) substantially in a horizontal plane, each foot area (41) being open at the rear and situated at a height in the lateral column (4) such that the rest surfaces (42) are each level with a bed plane of which said rest surfaces form part.

5. The block of two seats according to claim 2, in which the bed plane (35) in the bed configuration is vertically above the position of a seat cushion (31) of the seat in the chair configuration for at least one of the two seats (3).

6. The block of two seats according to claim 5, in which the foot areas (41) each comprise a rest surface (42) substantially in a horizontal plane, each foot area (41) being open at the rear and situated at a height in the lateral column (4) such that the rest surfaces (42) are each level with the bed plane of which said rest surfaces form part.

7. The block of two seats according to claim 2, in which the bed plane (35) in the bed configuration is vertically below the position of a seat cushion (31) of the seat in the chair configuration for at least one of the two seats (3).

8. The block of two seats according to claim 7, in which the foot areas (41) each comprise a rest surface (42) substantially in a horizontal plane, each foot area (41) being open at the rear and situated at a height in the lateral column (4) such that the rest surfaces (42) are each level with a bed plane of which said rest surfaces form part.

9. The block of two seats according to claim 2, in which the foot areas (41) each comprise a rest surface (42) substantially in a horizontal plane, each foot area (41) being open at the rear and situated at a height in the lateral column (4) such that the rest surfaces (42) are each level with a bed plane of which said rest surfaces form part.

10. The block of two seats according to claim 9, in which the bed plane (35) of a seat in the bed configuration is determined by the seat cushion (31) of said seat, the seat back (32) and the head rest (36) of said seat, a leg rest (33) of said seat and/or one or more movable panels, the plane being extended by the rest surface (42) of the foot area (41) of a similar block which would be placed in front of the block (2) in question or of a modified rear shell (21*e*) having characteristics similar to the lateral columns (4) of a block, said seat cushion, seat back, head rest, leg rest, movable panels and said rest surface being aligned substantially horizontally and in a same plane to form the bed.

11. The block of two seats according to claim 10, in which the bed planes (35) of the two seats (3), when said seats are both in the bed configuration, are vertically offset by a distance of between 350 and 500 mm.

12. A cabin (1) or a part of a cabin for transporting passengers, having at least one line of at least two of the blocks (2) of two seats (3) in accordance with claim 2, said at least two blocks being arranged one behind the other in the same direction of orientation of the seats and separated, in a direction of the line of blocks, by the block pitch X characterizing the distance between a reference point of each of the blocks (2), wherein for each of the two seats (3) of the block (2), following another block which precedes it in the direction of orientation of the seats (3), in the bed configuration a bed plane (35) of each seat (3) is extended by the foot area (41) situated in front of said seat, inside the block preceding it, into the lateral column (4) situated on the same side of the block as said seat in question.

13. A vehicle for transporting passengers, comprising the cabin or part of the cabin according to claim 12, said vehicle belonging to one of the categories of transporting passengers by land, sea or air.

14. The cabin according to claim 12, in which the seat (3) of the block (2) which has the bed plane situated vertically closest to the floor of the cabin (1) is situated on a side of the block (2) which is bordered by an aisle.

15. A vehicle for transporting passengers, comprising the cabin or part of the cabin according to claim 14, said vehicle belonging to one of the categories of transporting passengers by land, sea or air.

16. The cabin according to claim 14, in which the pitch X of the blocks (2) of at least one line of blocks is modified to form, in the bed configuration, beds with different lengths L0 depending on the block (2) in question.

17. A vehicle for transporting passengers, comprising the cabin or part of the cabin according to claim 16, said vehicle belonging to one of the categories of transporting passengers by land, sea or air.

18. The cabin according to claim 12, in which the frontmost block (2) in a line of blocks is preceded, at the front in a direction of orientation of the seats (3) of said line, by a modified rear shell (21*e*) comprising lateral columns (4) similar to the lateral columns (4) of a block (2).

19. A vehicle for transporting passengers, comprising the cabin or part of the cabin according to claim 18, said vehicle belonging to one of the categories of transporting passengers by land, sea or air.

20. A block (2) of two seats (3), in which each seat (3) can be converted individually, by a relative movement of elements (31, 32, 33, 36) of the seat, between a chair configuration in which an occupant of the seat is in a seated position and a bed configuration in which elements of the seat form a bed plane (35) and in which an occupant of the seat is stretched out substantially flat and substantially horizontally, wherein the two seats (3) are arranged side by side and oriented substantially in the same direction, wherein in the bed configuration, a longitudinal axis (34) of each of the seats (3) converges towards a convergence point situated in a vertical plane of symmetry of the block behind said seats such that the longitudinal axes (34) of the two seats of the block are closer together in a head area (46) of said block, in which head area upper parts of the seat backs and/or of the head rests (36) of the two seats (3) are at least partially superposed in a vertical projection;

when the two seats (3) are in the bed configuration, the bed plane (35) of one of the two seats is situated at a different height, relative to a reference surface corresponding to a cabin floor when said block is installed in a cabin, from the bed plane of the other seat, and when the two seats (3) are in the bed configuration, the bed plane (35) of one of the two seats is vertically above the position of the seat cushions (31) of the seats in the chair configuration, and the bed plane (35) of the other seat is below the position of the seat cushions (31).

\* \* \* \* \*